United States Patent [19]

Kawakami et al.

[11] Patent Number: 5,605,987
[45] Date of Patent: Feb. 25, 1997

[54] PRODUCTION PROCESS OF ALKYLENE THIOETHER-ARYLENE THIOETHER COPOLYMER

[75] Inventors: Yukichika Kawakami; Mitsuru Hoshino; Hiroyuki Sato, all of Iwaki, Japan

[73] Assignee: Kureha Kagaku Kogyo K.K., Tokyo, Japan

[21] Appl. No.: 920,743

[22] Filed: Jul. 8, 1992

[30] Foreign Application Priority Data

Jul. 24, 1991 [JP] Japan .................................. 3-207598

[51] Int. Cl.$^6$ .................................................. C08F 283/00
[52] U.S. Cl. ........................................... 525/537; 528/388
[58] Field of Search ............................... 525/537; 528/388

[56] References Cited

U.S. PATENT DOCUMENTS

| | | |
|---|---|---|
| 3,919,177 | 11/1975 | Campbell . |
| 4,645,826 | 2/1987 | Iizuka et al. . |
| 5,066,775 | 11/1991 | Dorf et al. .............................. 528/388 |

FOREIGN PATENT DOCUMENTS

| | | |
|---|---|---|
| 0355541 | 2/1990 | European Pat. Off. . |
| 0372744 | 6/1990 | European Pat. Off. . |
| 0383119 | 8/1990 | European Pat. Off. . |
| 0459620A2 | 12/1991 | European Pat. Off. . |
| 45-19713 | 7/1970 | Japan . |
| 46-4398 | 2/1971 | Japan . |
| 61-197634 | 9/1986 | Japan . |
| 61-200127 | 9/1986 | Japan . |
| 62-529 | 1/1987 | Japan . |
| 62-530 | 1/1987 | Japan . |
| 62-20530 | 1/1987 | Japan . |
| 62-48727 | 3/1987 | Japan . |
| 62-9150 | 4/1987 | Japan . |
| 140233 | 5/1990 | Japan . |
| 247228 | 10/1990 | Japan . |
| 7334 | 1/1992 | Japan . |
| 4-7334 | 1/1992 | Japan . |

*Primary Examiner*—Melvyn I. Marquis
*Attorney, Agent, or Firm*—Lowe, Price, LeBlanc & Becker

[57] ABSTRACT

Disclosed herein is a process for the production of an alkylene thioether-arylene thioether copolymer, which comprises copolymerizably reacting a compound having at least one alkali thiolate group and obtained by causing an alkali metal sulfide to act on a poly(arylene thioether) in a water-containing polar organic solvent so as to depolymerize the poly(arylene thioether) with a dihalogen-substituted aliphatic compound in a water-containing polar organic solvent.

9 Claims, No Drawings

PRODUCTION PROCESS OF ALKYLENE THIOETHER-ARYLENE THIOETHER COPOLYMER

FIELD OF THE INVENTION

This invention relates to a novel process for the production of alkylene thioether-arylene thioether copolymers (hereinafter abbreviated as "A-A copolymers") which have an alkylene thioether component and an arylene thioether component in their principal chains.

BACKGROUND OF THE INVENTION

Poly(arylene thioether) (hereinafter abbreviated as "PATE") represented by poly(p-phenylene sulfide) is known as a polymer having a high crystalline melting point and excellent in heat resistance, solvent resistance and mechanical properties.

However, PATE, which is an aromatic polymer, is restricted in its application to uses for which flexibility is required due to its high crystalline melting point and glass transition temperature, or involves a drawback to its development into fields used as a solution due to its high solvent resistance. Therefore, it has been strongly desired to improve the above-described problems while retaining the good heat resistance of PATE.

The present inventors started an investigation with a view toward providing improved A-A copolymers by introducing an alkylene thioether component, which has aliphatic recurring units, in the arylene thioether component constituting PATE.

First of all, the present inventors repeatedly carried out an investigation with a view toward reacting a dihalogen-substituted aromatic compound forming an arylene thioether component and a dihalogen-substituted aliphatic compound forming an alkylene thioether component together with an alkali metal sulfide in a polar organic solvent, thereby preparing a copolymer. It was however impossible to prepare an A-A copolymer having the intended properties and a uniform composition.

This is believed to be based on the following reason. The dihalogen-substituted aromatic compound is different from the dihalogen-substituted aliphatic compound in reactivity and stability to the alkali metal sulfide. It is therefore difficult for them to undergo a copolymerization reaction under the same reaction conditions. Namely, the dihalogen-substituted aliphatic compound exhibits good reactivity to the alkali metal sulfide under relatively mild conditions as to polymerization temperature (for example, about 200° C. or lower), while the dihalogen-substituted aromatic compound is stable under the same conditions and scarcely reacts with the alkali metal sulfide. On the other hand, the dihalogen-substituted aromatic compound shows good reactivity under conditions higher than such a temperature (for example, higher than 200° C.), while the dihalogen-substituted aliphatic compound becomes liable to decompose under such conditions. It is therefore difficult to conduct a copolymerization reaction in either case.

The present inventors previously found that when an alkali metal sulfide is caused to act on PATE in a polar organic solvent, the principal chain of PATE is cut to depolymerize PATE, whereby a compound having at least one alkali thiolate group can be obtained (Japanese Patent Application Laid-Open No. 7334/1992 and U.S. Pat. application Ser. No. 07/686,972, abandoned). This process according to the depolymerization features that a compound having an alkali thiolate group, which is a group rich in reactivity, can be formed in a desired form by optionally adjusting its average polymerization degree to any level ranging from oligomers to polymers relatively high in molecular weight. In addition, it is expectable to provide a copolymer having a uniform composition when using a compound, which has a relatively low average polymerization degree of about 50 or lower and has been obtained by this depolymerization process, as a copolymerizing component with other components because the molecular weight distribution of this compound is relatively even.

The present inventors continued the investigation with a view toward forming an A-A copolymer by using a compound obtained by this depolymerization process as an arylene thioether component and a dihalogen-substituted aliphatic compound as an alkylene thioether component to copolymerize them.

By the way, it is disclosed in Japanese Patent Application Laid-Open No. 48727/1987 to add a polyhalogenated aliphatic compound at an optional stage of polymerization upon producing a poly(arylene thioether) by the reaction of a dihalogenated aromatic compound with an alkali metal sulfide in a polar organic solvent, thereby obtaining the poly(arylene thioether) as a polymer high in melt crystallization temperature. In Japanese Patent Application Laid-Open No. 247228/1990, there is also disclosed a process for the production of a polymer by reacting a dihalogen-substituted aromatic compound with a dihalogen-substituted aliphatic compound. However, these processes do not relate to the production process of copolymers in which an alkali thiolate-containing compound obtained by the depolymerization of PATE is used.

On the other hand, it is disclosed in Japanese Patent Application Laid-Open No. 140233/1990 to react a poly(phenylene sulfide) with an alkali metal sulfide at 150°–230° C. in a polar aprotic solvent, thereby producing a poly(phenylene sulfide) having a thiolate or thiol group on at least one terminal thereof. However, this polymer is not a polymer obtained by depolymerization. In addition, it is only disclosed that the polymer is used for forming a graft polymer which serves as a compatibilizer by melting it to mix with various kinds of polymers.

As another production process of an arylene thioether polymer, it has been proposed to react a dihalogen-substituted aromatic compound with an aromatic dithiol or an alkali metal salt thereof (alkali thiolate) (Japanese Patent Publication Nos. 19713/1970 and 4398/1971, Japanese Patent Application Laid-Open Nos. 197634/1986, 200127/1986, 529/1987, 530/1987, 91530/1987 and 20530/1987, etc.). However, these production processes relate to the production process of polymers in which aromatic compounds are used, but do not relate to the production process of A-A copolymers wherein a dihalogen-substituted aliphatic compound is used as a copolymerizing component.

OBJECT AND SUMMARY OF THE INVENTION

An object of this invention is to provide a novel process for the production of A-A copolymers, which have an arylene thioether component and an alkylene thioether component in their principal chains, by using, as a copolymerizing component, a compound having at least one alkali thiolate group and obtained by causing an alkali metal sulfide to act on PATE to depolymerize the PATE.

The present inventors have carried out an extensive investigation as to compounds having at least one alkali thiolate group and obtained by the depolymerization of PATE. As a result, it has been found that such a compound easily reacts in a water-containing polar organic solvent under relatively mild polymerization conditions (for example, about 100° C. or lower) if a dihalogen-substituted aliphatic compound coexists therein, thereby permitting the production of an A-A copolymer having a uniform composition and improved in both flexibility and solubility in solvents.

The present invention has been led to completion on the basis of this finding.

According to this invention, there is thus provided a process for the production of an alkylene thioether-arylene thioether copolymer, which comprises copolymerizably reacting a compound having at least one alkali thiolate group and obtained by causing an alkali metal sulfide to act on a poly(arylene thioether) having recurring units represented by the general formula (I):

(I)

wherein Ar means an arylene group, in a water-containing polar organic solvent so as to depolymerize the poly(arylene thioether) with a dihalogen-substituted aliphatic compound represented by the general formula (II):

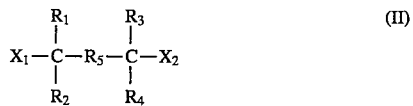

(II)

wherein $X_1$ and $X_2$ mean individually a halogen atom, $R_1$ through $R_4$ denote individually a hydrogen atom or an alkyl group having 1–6 carbon atoms and may be identical to or different from one another, and $R_5$ stands for an aliphatic compound residue having 1–200 carbon atoms, and optionally, an alkali metal sulfide in a water-containing polar organic solvent.

DETAILED DESCRIPTION OF THE INVENTION

Features of the present invention will hereinafter be described in detail.

PATE:

PATEs useful to obtain a compound having at least one alkali thiolate group are polymers having predominant recurring units represented by the general formula (I) and may be used in a wide range of from polymers of high polymerization degrees to oligomers of low polymerization degrees, which have about several to several tens recurring units.

Ar in the recurring unit is an arylene group and means a residue after subtracting two hydrogen atoms from benzene. Those having one or more substituent groups on its nucleus may also be included therein.

As preferred arylene groups, may be mentioned a phenylene group and substituted phenylene groups, which are represented respectively by the following formulae:

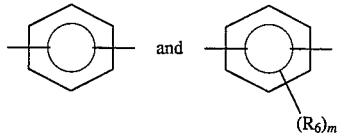

wherein $R_6$ means a substituent group selected from alkyl or alkoxy groups having 1–6 carbon atom, a phenyl group, a carboxyl group, a cyano group, an amino group and halogen atoms, and m stands for an integer of 1–4.

The recurring units represented by the general formula [I] are contained in a proportion of at least 70 wt. %, preferably at least 80 wt. %, most preferably at least 90 wt. % in the PATE used in this invention. If the content of the recurring units is less than 70 wt. %, there is a potential problem that the heat resistance of the resulting copolymer is impaired. Any contents less than 70 wt. % are therefore not preferred.

As exemplary units constituting minor components other than the recurring units represented by the general formula [I], may be mentioned diphenyl sulfide units, diphenyl ketone sulfide units, diphenyl ether sulfide units diphenyl sulfone sulfide units, 2,6-dinaphthalene disulfide units and the like.

As preferred PATEs, may be mentioned poly(p-phenylene sulfide), poly(p-phenylene sulfide) with poly(m-phenylene sulfide) contained as a minor component therein, and the like.

As disclosed in, for example, U.S. Pat. Nos. 3,919,177 and 4,645,826, PATEs useful in the practice of this invention can be obtained by polymerizing under heat an alkali metal sulfide and a dihalogen-substituted aromatic compound in the presence of water in a polar organic solvent such as N-methylpyrrolidone. It is also permissible to use a PATE, which has a partially crosslinked and/or branched structure and has been obtained by adding a small amount of a polyhalobenzene such as trichlorobenzene upon polymerization to copolymerize it.

Although the PATE thus obtained may be used in the form isolated from the reaction mixture, the reaction mixture may be provided as a component for depolymerization as it is. When the reaction mixture is used as a part or the whole of a raw material for depolymerization as it is without isolating the PATE from the reaction mixture in particular, it is desirable to substantially complete the polymerization reaction so as not to leave the dihalogen-substituted aromatic compound. If a fair amount of the dihalogen-substituted aromatic compound remains in an unreacted state, there are potential problems that a subsequent depolymerization reaction is delayed, and the composition and molecular weight distribution of the resulting A-A copolymer are varied.

Polar organic solvent:

As the polar organic solvent, aprotic organic amide solvents typified by N-alkylpyrrolidones such as N-methylpyrrolidone, 1,3-dialkyl-2-imidazolidinones, tetraalkylureas, hexaalkylphosphoric triamides and the like and mixtures thereof are preferred because they have good stability in reaction.

Alkali metal sulfide:

As preferred examples of the alkali metal sulfide used in the depolymerization of the PATE, may be mentioned lithium sulfide, sodium sulfide, potassium sulfide, rubidium sulfide, cesium sulfide and mixtures thereof. These alkali metal sulfides can be used as hydrates or aqueous mixtures, or in anhydrous forms.

In addition, an alkali metal sulfide prepared in situ from an alkali metal hydrosulfide and an alkali metal hydroxide in a reaction system may also be used.

Alkali thiolate-containing compound:

It is believed that the compound obtained by causing an alkali metal sulfide to act on a PATE to depolymerize the PATE contains at least one alkali thiolate group in its molecule and consists principally of a compound represented by the following general formula (III):

$$MS(-Ar-S)_nM \qquad (III)$$

wherein M means an alkali metal atom, Ar denotes an arylene group, and n stands for a number of recurring units.

Here, the number of recurring units, n preferably falls within a range of 2–50, preferably 2.5–30, more preferably 3–20 upon the production of A-A copolymers according to the present invention. If n exceeds 50, the effect to reduce the melting point and glass transition temperature of the resulting copolymer becomes insufficient. On the other hand, if n is smaller than 2, the effect to reduce the melting point and glass transition temperature of the resulting copolymer becomes greater, but it is difficult to prepare a compound having a desired number of recurring units.

This alkali thiolate-containing compound is copolymerized with a dihalogen-substituted aliphatic compound to form an arylene thioether component of the A-A copolymer.

The preparation process of the alkali thiolate-containing compound will hereinafter be described specifically. This compound can suitably be obtained by subjecting a mixture comprising:

(A) a polar organic solvent containing water in a proportion of 0.1–10 moles per kg of the polar organic solvent;

(B) a PATE in a proportion of 0.1–5 basal moles per kg of the polar organic solvent, wherein the term "basal mole" means the number of moles, which has been calculated supposing the sum of atomic weights of atoms constituting the recurring unit represented by the general formula (I) is 1 gram molecule; and (C) an alkali metal sulfide in a proportion of 0.02–1 mole per basal mole of the PATE, to a depolymerization reaction.

The reaction is generally conducted at 230°–300° C., preferably 235°–290° C., most preferably 240°–280° C. Any reaction temperatures lower than 230° C. result in insufficient depolymerization and formation of alkali thiolate group, and require too long reaction time. On the other hand, if the temperature is higher than 300° C., an undesirable side reaction tends to occur. Reaction temperatures outside the above range are therefore not preferred.

The reaction is generally conducted for 0.2–30 hours, preferably 0.5–20 hours. Any reaction time shorter than 0.2 hour involves a potential problem of insufficient reaction. To the contrary, any time longer than 30 hours involves an economical disadvantage.

The water content in the polar organic solvent is generally within a range of 0.1–10 moles, preferably 0.2–7 moles per kg of the polar organic solvent. Any water contents less than 0.1 mole involve a potential problem that the solubility of the alkali metal sulfide becomes insufficient. On the other hand, any water contents more than 10 moles are accompanied by a potential problem that depolymerization and formation of alkali thiolate group become insufficient and/or an undesirable side reaction occurs.

The amount of the PATE used in the depolymerization is generally within a range of 0.1–5 basal moles, preferably 0.2–4 basal moles per kg of the polar organic solvent. Any amounts less than 0.1 basal mole result in reduction in productivity and hence involve an economical disadvantage. To the contrary, any amounts more than 5 basal moles result in viscosity increase in the course of reaction. Amounts outside the above range are hence not preferred.

The amount of the alkali metal sulfide is generally within a range of 0.02–1 mole, preferably 0.03–0.8 mole, most preferably 0.05–0.6 mole per basal mole of the PATE. Any amounts less than 0.02 mole involve a potential problem that the formation of alkali thiolate group becomes insufficient. To the contrary, any amounts exceeding 1 mole are accompanied by a potential problem that the unreacted alkali metal sulfide becomes too much and an undesirable side reaction hence occurs in a subsequent copolymerization reaction, whereby the uniformity in composition of the resulting A-A copolymer is impaired.

The mixture comprising the water-containing polar organic solvent, PATE and alkali metal sulfide is desirably alkaline such that the pH of an aqueous mixture obtained by diluting the mixture with water in an amount 100 times the weight of the mixture is 9 or higher, preferably 10 or higher, most preferably 11 or higher. Any pH lower than 9 involves a potential problem that the depolymerization and formation of alkali thiolate group become insufficient and at the same time, a decomposition reaction occurs.

In order to alkalify the mixture to a desired extent, the addition of a basic compound is preferred. As such a basic compound, may be mentioned at least one compound selected from the hydroxides, oxides and carbonates of alkali metals or alkaline earth metals.

The alkali thiolate-containing compound may be used as a component in the subsequent copolymerization reaction to produce the A-A copolymer as it is in the form of a (liquid) reaction mixture containing same. In this case, the liquid reaction mixture may be partially neutralized with an acid substance such as a proton acid and/or a salt of a strong acid and a weak base before it is used as a component in the copolymerization reaction. However, it is not preferred to acidify the reaction mixture because the active alkali thiolate group becomes liable to convert into a thiol group. The polar organic solvent and water, both, contained in the reaction mixture may be used as partial components in the copolymerization reaction as they are.

It is also possible to separate once the alkali thiolate-containing compound from the reaction mixture under non-oxidizing conditions and then use it as a component in the copolymerization reaction.

Dihalogen-substituted aliphatic compound:

The dihalogen-substituted aliphatic compound useful in the practice of this invention is a compound represented by general formula (II):

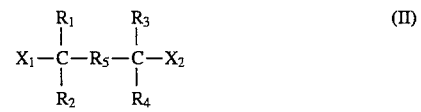

wherein $X_1$ and $X_2$ mean individually a halogen atom, $R_1$ through $R_4$ denote individually a hydrogen atom or an alkyl group having 1–6 carbon atoms and may be identical to or different from one another, and $R_5$ stands for an aliphatic compound residue having 1–200 carbon atoms.

$R_5$ in this formula means an aliphatic compound residue. The number of carbon atoms in $R_5$ falls within a range of 1–200, preferably 2–100, most preferably 3–20.

The flexibility of the resulting A-A copolymer is more improved as the number of carbon atoms in $R_5$ increases. However, if the number of carbon atoms exceeds 200, the copolymerizability of the aliphatic compound is lowered due to reduction in both solubility in solvents and concentration of functional groups. It is hence not preferred for $R_5$ to have such many carbon atoms.

This dihalogen-substituted aliphatic compound is copolymerized with an alkali thiolate-containing compound to form an alkylene thioether component of the A-A copolymer.

As specific examples of the dihalogen-substituted aliphatic compound, may be mentioned dihaloalkanes such as 1,3-dihalopropanes, 1,4-dihalobutanes, 1,5-dihalopentanes, 1,6-dihalohexanes, 1,10-dihalodecane and 1,12-dihalododecane; and dihalogenated olefin oligomers such as α,ω-dihalogenated butadiene oligomers and α,ω-dihalogenated isoprene oligomers, and hydrogenated products thereof.

Among these, dihaloalkanes are preferred.

Preparation process of A-A copolymer:

The copolymerization reaction of the alkali thiolate-containing compound with the dihalogen-substituted aliphatic compound represented by the general formulae [II] can suitably be conducted by subjecting a mixture comprising:

(a) the polar organic solvent containing water in a proportion of 0.1–30 moles per kg of the polar organic solvent;

(b) the alkali thiolate-containing compound in a proportion of 0.1–10 basal moles per kg of the polar organic solvent; and (c) the dihalogen-substituted aliphatic compound in a proportion of 0.8–2 moles per mole of the alkali thiolate-containing compound to a reaction under heat.

The amount of water contained in the reaction system is within a range of 0.1–30 moles, preferably 0.2–25 moles, most preferably 0.3–20 moles per kg of the polar organic solvent. If the amount of water is less than 0.1 mole, good reactivity can not be attained. On the other than, any amounts exceeding 30 moles involve a potential problem that the alkali thiolate-containing compound is decomposed.

The amount of the alkali thiolate-containing compound is desirably within a range of 0.1–10 basal moles, preferably 0.2–5 basal moles, most preferably 0.3–3 basal moles per kg of the polar organic solvent. Any amounts less than 0.1 basal mole are disadvantageous in productivity. To the contrary, any amounts more than 10 basal moles result in the formation of a reaction system high in viscosity. Amounts outside the above range are hence not preferred.

The amount of the dihalogen-substituted aliphatic compound is desirably within a range of 0.8–2 moles, preferably 0.9–1.5 moles, most preferably 0.95–1.2 moles per mole of the alkali thiolate-containing compound. If the amount is less than 0.8 mole or more than 2 moles, a high-molecular weight A-A copolymer is hard to obtain.

The number of moles of the alkali thiolate-containing compound in this invention is defined as the number of moles of the alkali metal sulfide, which has been determined by subtracting the amount of the remaining alkali metal sulfide after the depolymerization reaction from the amount of the alkali metal sulfide added upon the depolymerization reaction of PATE to prepare the alkali thiolate-containing compound.

In the present invention, an alkali metal sulfide may be used in the copolymerization reaction of the alkali thiolate-containing compound with the dihalogen-substituted aliphatic compound, if necessary. In this case, the alkali metal sulfide may be used in an amount of less than 50 mol %, preferably 40 mol % or less, most preferably 30 mol % or less based on the total number of moles of the alkali thiolate-containing compound and the alkali metal sulfide to be used.

The amount of the alkali metal sulfide to be used in this case is added to the number of moles of the alkali thiolate-containing compound, which has been defined above upon the recitation as to the amount of the dihalogen-substituted aliphatic compound, and this total amount is hence regarded as the number of moles of the alkali thiolate-containing compound.

It is a preferred reaction form in the copolymerization reaction in the case where the alkali metal sulfide is used to use the reaction mixture containing the alkali thiolate-containing compound, which has been prepared by the depolymerization reaction, as a copolymerizing component for the preparation of an A-A copolymer so as to utilize the alkali metal sulfide remaining in this reaction mixture as a part or the whole of the alkali metal sulfide to be used in the copolymerization reaction.

The temperature of the polymerization reaction is generally 30°–220° C., preferably 50°–220° C., most preferably 60°–220° C. Any reaction temperatures lower than 30° C. involve a potential problem that the reaction rate is lowered, resulting in an economical disadvantage. To the contrary, any temperatures exceeding 220° C. is accompanied by a potential problem that the resulting A-A copolymer is decomposed.

The polymerization time is generally 0.2–30 hours, preferably 0.5–20 hours. Any polymerization time shorter than 0.2 hour involves a potential problem that the polymerization reaction becomes insufficient. On the other hand, any time exceeding 30 hours results in poor productivity.

When the polymerization reaction is conducted, as a reaction of the first stage, for 0.2–30 hours at 30°–220° C. and then, as a reaction of the second stage, for 0–30 hours, preferably 0.2–30 hours at a temperature higher than 220° C. but not higher than 300° C., preferably a high temperature of 230°–270° C. with or without addition of water, a high-molecular weight A-A copolymer can be obtained. It is desirable to add water before or after the temperature is raised upon the reaction of the second stage so as to control the water content in the reaction system within a range of 5–30 moles, preferably 6–20 moles per mole of the polar organic solvent in the system.

ADVANTAGES OF THE INVENTION

According to this invention, there is provided a novel production process of alkylene thioether-arylene thioether copolymers.

In addition, the present invention provides an economical production process of the copolymers with good uniformity in composition.

The alkylene thioether-arylene thioether copolymers obtained in accordance with the production process of this invention are excellent in heat resistance, flexibility, solubility in solvents, etc. and can be used either singly or as blends with other resins and/or the like in a wide variety of application fields, for example, as injection-molded products, extruded products, etc.

EMBODIMENTS OF THE INVENTION

The present invention will hereinafter be described more specifically by the following Examples, Comparative Examples and Referential Examples.

Incidentally, the following methods were followed for the measurements of the physical properties of polymers in the following examples.

<Melting point (Tm), glass transition temperature (Tg)>

The melting point (Tm) and glass transition temperature (Tm) of each polymer sample were measured in the following manner. The polymer sample is formed into a sheet of 0.5 mm thick by hot-pressing it and then quenching the polymer thus hot-pressed. The thus-obtained sheet was heated by a differential scanning calorimeter (DSC, manufactured by Mettler Instrument AG) at a rate of 10° C./min in a nitrogen atmosphere so as to measure its melting point (Tm) and glass transition temperature (Tg).

<Melt viscosity (η*)>

The melt viscosity (η*) of each polymer sample was measured at a temperature higher than its melting point by 50° C. and a shear rate of 1,200/sec by a Capirograph (manufactured by Toyo Seiki Seisaku-Sho, Ltd.).

<Compositional ratio of polymer>

Calculated from the data of elemental analysis as to sulfur in each polymer sample.

<Determination of number-average molecular weight>

A portion of the reaction mixture containing an alkali thiolate-containing compound was sampled out and then added with a significantly excess amount of methyl iodide. The resultant mixture was stirred for 24 hours at room temperature, whereby the alkali thiolate groups were converted into methyl thioether groups. This reaction mixture sample was poured into a great amount of water. After being neutralized, the resulting product was washed with water, dewatered and dried under reduced pressure (at room temperature) to prepare a sample. The number-average molecular weight was determined by gel permeation chromatography (GPC).

Measuring conditions are as follows:

Column: SHODEX AT 80M/S, two columns in series

Solvent: α-chloronaphthalene

Flow rate: 0.7 ml/min

Temperature: 220° C.

Sample concentration: 0.05 wt. %

Charged amount: 200 μl

Detector: flame ionization detector (FID)

Calibration of molecular weight:
standard poly(styrene) and

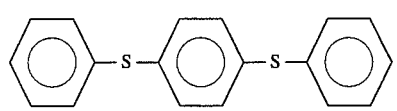

Data processing: SIC 7000B (manufactured by System Instrument Co.)

REFERENTIAL EXAMPLE 1

(Preparation example 1 of PATE)

After a mixture of 10.0 kg of N-methylpyrrolidone (hereinafter abbreviated as "NMP"), 1,560 g (20.0 moles) of $Na_2S$, 3,000 g (20.4 moles) of p-dichlorobenzene, 7.4 g (0.041 mole) of 1,2,4-trichlorobenzene, 540 g (30 moles) of water and 22 g (0.3 mole) of $Ca(OH)_2$ was heated for 5 hours at a temperature of 220° C. in a titanium-lined autoclave, 900 g (50 moles) of water was additionally introduced under pressure in the autoclave. The contents were heated to 255° C., held for 5 hours at the same temperature and then cooled to 245° C. at which they were held for 5 hours, thereby reacting them.

The resultant reaction mixture was sifted by a screen to separate the resulting particulate polymer. The polymer was washed with acetone and further with water, and then dewatered and dried, thereby obtaining a polymer [PATE (1)] in the form of granules.

PATE (1) thus obtained had a melt viscosity of 4,000 poises (at 310° C.) and 3,400 poises (at 326° C.), a melting point (Tm) of 276° C. and a glass transition temperature (Tg) of 87° C.

REFERENTIAL EXAMPLE 2

(Preparation example 2 of PATE)

After a mixture of 10.0 kg of NMP, 1,560 g (20.0 moles) of $Na_2S$, 3,000 g (20.4 moles) of p-dichlorobenzene, 540 g (30 moles) of water and 22 g (0.3 mole) of $Ca(OH)_2$ was heated for 4.5 hours at a temperature of 220° C. in a titanium-lined autoclave, 720 g (40 moles) of water was additionally introduced under pressure in the autoclave. The contents were heated to 255° C. and held for 5 hours at the same temperature to react them.

The resultant reaction mixture was sifted by a screen to separate the resulting particulate polymer. The polymer was washed with acetone and further with water, and then dewatered and dried, thereby obtaining a polymer [PATE (2)] in the form of granules.

PATE (2) thus obtained had a melt viscosity of 2,100 poises (at 310° C.) and 1,850 poises (at 332° C.), Tm of 282° C. and Tg of 85° C.

EXAMPLE 1

In a titanium-lined autoclave, 86.4 g (0.8 basal mole) of the granular PATE (1), 1,200 g of NMP, 15.6 g (0.20 mole) of $Na_2S$, 16 g (0.4 mole) of NaOH and 36.0 g (2 moles) of water were stirred to prepare a liquid mixture. The pH of an aqueous mixture obtained by diluting a portion of the liquid mixture with water in an amount 100 times the weight of the liquid mixture was 11.6.

The liquid mixture was heated for 1 hour at 250° C. to conduct depolymerization to cut the molecular chain of PATE (1) by $Na_2S$ and alkali thiolate-forming reaction, thereby converting PATE (1) into an alkali thiolate-containing product. A small amount of the reaction mixture was sampled out to determine the amount of $S^{-2}$ in the reaction mixture was determined by ion chromatography. As a result, it was found that most of $Na_2S$ reacted and its remaining amount was 5 mol % of the charged amount.

After the reaction mixture (containing 0.19 mole of the alkali thiolate-containing product and 0.01 mole of $Na_2S$) subjected to the alkali thiolate-forming reaction was added with 65.6 g (0.2 mole) of 1,12-dibromododecane to react them for 3 hours at 190° C., 108 g (6 moles) of water was introduced under pressure to heat the contents further for 3 hours at 250° C.

After the autoclave was then cooled, the contents were taken out of the autoclave to pour them into water, thereby sifting water-insoluble white solids (by 100 mesh screen). The thus-separated product was washed with acetone, treated with a 3% aqueous solution of $NH_4Cl$ and then washed further with water, thereby obtaining a polymer in a wet form. The wet polymer thus obtained was dried under reduced pressure for 24 hours at 70° C., thereby obtaining a polymer [A-A Copolymer (1)] as a white flake.

A-A Copolymer (1) thus obtained had Tm of 200° C., Tg of −15° C. and a melt viscosity of 200 poises (at 250° C.).

A portion of the reaction mixture obtained by causing $Na_2S$ to act on PATE (1) and containing the alkali thiolate-containing product was added with aqueous hydrochloric acid to deposit a precipitate. The precipitate was separated by filtration, and then washed with water and dried under reduced pressure, thereby obtaining white powder. In an infrared spectrum of this white powder, an absorption peak attributed to the stretching vibration of —SH, which was not observed on PATE (1), was observed at 2560 cm$^1$. Further, the number-average molecular weight of a product with the alkali thiolate groups in the alkali thiolate-containing product converted into methyl thioether groups was found to be about 500. This means that the alkali-thiolate containing product corresponds to an alkali-thiolate containing compound represented by the general formula (III) in which n is about 4.0.

In an infrared absorption spectrum on A-A Copolymer (1) on the other hand, the absorption peak attributed to —SH disappeared and instead, an absorption peak attributed to the C-H stretching vibration of —CH$_2$— was observed between 3000 and 2800 cm$^{-1}$.

From the results of the above measurements and elemental analysis, A-A Copolymer (1) thus obtained is judged to be a copolymer having an average composition composed of 24 mol % of units represented by the chemical formula:

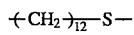

and 76 mol % of units represented by the chemical formula:

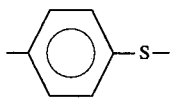

EXAMPLE 2

A titania-lined autoclave was charged with 97.2 g (0.90 basal mole) of the granular PATE (1), 1,200 g of NMP, 7.8 g (0.10 mole) of Na$_2$S, 12 g (0.3 mole) of NaOH and 45 g (2.5 moles) of water. The contents were heated for 2 hours at 2500C to conduct depolymerization to cut the molecular chain of PATE (1) by Na$_2$S, thereby converting PATE (1) into an alkali thiolate-containing product. The amount of Na$_2$S remaining in this reaction mixture was approximately zero.

After the reaction mixture (containing 0.10 mole of the alkali thiolate-containing product) subjected to the alkali thiolate-foxing reaction was added with 32.8 g (0.1 mole) of 1,12-dibromododecane to react them for 3 hours at 190° C., 144 g (8 moles) of water was introduced under pressure to heat the contents further for 3 hours at 250° C.

The resulting reaction mixture was treated in the same manner as in Example 1 to obtain a poller [A-A Copolymer (2)] as a white flake.

A-A Copolymer (1) thus obtained had Tm of 242° C., Tg of 24° C. and a melt viscosity of 2,600 poises (at 292° C.).

The infrared absorption spectrum of white powder obtained by treating the reaction mixture obtained by causing Na$_2$S to act on PATE (1) and containing the alkali thiolate-containing product in the same manner as in Example 1 was measured. As a result, an absorption peak attributed to the stretching vibration of —SH was observed at 2560 cm$^{-1}$. Further, the number-average molecular weight of a product with the alkali thiolate groups in the alkali thiolate-containing product converted into methyl thioether groups was found to be about 1050. This means that the alkali-thiolate containing product corresponds to an alkalithiolate containing compound represented by the general formula (III) in which n is about 9.1.

In an infrared absorption spectrum on A-A Copolymer (2) on the other hand, the absorption peak attributed to —SH disappeared and instead, an absorption peak attributed to the C-H stretching vibration of —CH$_2$— was observed between 3000 and 2800 cm$^{-1}$.

From the results of the above measurements and elemental analysis, A-A Copolymer (2) thus obtained is judged to be a copolymer having an average composition composed of 11 mol % of units represented by the chemical formula:

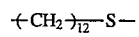

and 89 mol % of units represented by the chemical formula:

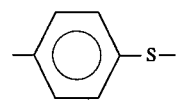

EXAMPLE 3

A titanium-lined autoclave was charged with 432.0 g (3.99 basal moles) of the granular PATE (2), 6,000 g of NMP, 78.0 g (1.0 mole) of Na$_2$S, 30.0 g (0.75 mole) of NaOH and 180.0 g (10 moles) of water. After the autoclave being purged with nitrogen gas, the contents were heated for 2 hours at 240° C. while stirring them to conduct depolymerization to cut the molecular chain of PATE (2) by Na$_2$S, thereby converting PATE (2) into an alkali thiolate-containing product. The amount of Na$_2$S remaining in this reaction mixture was 4 mol % of the charged amount.

After the reaction mixture (containing 0.96 mole of the alkali thiolate-containing product and 0.04 mole of Na$_2$S) subjected to the alkali thiolate-forming reaction was added with 310.0 g (1.03 moles) of 1,10-dibromodecane to react them for 3 hours at a temperature of 80°–100° C., 900 g (49.9 moles) of water was introduced under pressure to react the contents further for 4 hours at 220° C.

The resulting reaction mixture was treated in the same manner as in Example 1 to obtain a polymer [A-A Copolymer (3)] as white granules.

A-A Copolymer (3) thus obtained had Tm of 185° C., Tg of −6° C. and a melt viscosity of 1,500 poises (at 235° C.).

The infrared absorption spectrum of white powder obtained by treating the reaction mixture obtained by causing Na$_2$S to act on PATE (2) and containing the alkali thiolate-containing product in the same manner as in Example 1 was measured. As a result, an absorption peak attributed to the stretching vibration of —SH was observed at 2560 cm$^{-1}$. Further, the number-average molecular weight of a product with the alkali thiolate groups in the alkali thiolate-containing product converted into methyl thioether groups was found to be about 500. This means that the alkali-thiolate containing product corresponds to an alkalithiolate containing compound represented by the general formula (III) in which n is about 4.0.

In an infrared absorption spectrum on A-A Copolymer (3) on the other hand, the absorption peak attributed to —SH disappeared and instead, an absorption peak attributed to the C-H stretching vibration of —CH$_2$— was observed between 3000 and 2800 cm$^{-1}$.

From the results of the above measurements and elemental analysis, A-A Copolymer (3) thus obtained is judged to be a copolymer having an average composition composed of 23 mol % of units represented by the chemical formula:

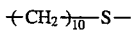

and 77 mol % of units represented by the chemical formula:

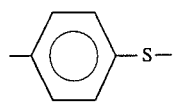

in terms of average composition.

EXAMPLE 4

A titanium-lined autoclave was charged with 500.0 g (4.62 basal moles) of the granular PATE (2), 5,000 g of NMP, 54.3 g (1.98 moles) of Na$_2$S and 178 g (9.9 moles) of water. After the autoclave being purged with nitrogen gas, the contents were heated for 2 hours at 240° C. while stirring them to conduct a thiolate-forming reaction to cut the molecular chain of PATE (2), thereby converting PATE (2) into an alkali thiolate-containing product. The amount of Na$_2$S remaining in this reaction mixture was 35 mol % of the charged amount.

After the reaction mixture (containing 1.29 moles of the alkali thiolate-containing product and 0.69 mole of Na$_2$S) subjected to the alkali thiolate-forming reaction was added with 600.0 g (2.00 moles) of 1,10-dibromodecane to react them for 3 hours at a temperature of 80°–100° C., 800 g (44.4 moles) of water was introduced under pressure to react the contents further for 4 hours at 220° C.

The resulting reaction mixture was treated in the same manner as in Example 1 to obtain a polymer [A-A Copolymer (4)] as granules.

A-A Copolymer (4) thus obtained had Tm of 147° C., Tg of −20° C. and a melt viscosity of 100 poises (at 197° C.).

The infrared absorption spectrum of white powder obtained by treating the reaction mixture obtained by causing Na$_2$S to act on PATE (2) and containing the alkali thiolate-containing product in the same manner as in Example 1 was measured. As a result, an absorption peak attributed to the stretching vibration of —SH was observed at 2560 cm$^{-1}$. Further, the number-average molecular weight of a product with the alkali thiolate groups in the alkali thiolate-containing product converted into methyl thioether groups was found to be about 450. This means that the alkali-thiolate containing product corresponds to an alkalithiolate containing compound represented by the general formula (III) in which n is about 3.8.

In an infrared absorption spectrum on A-A Copolymer (4) on the other hand, the absorption peak attributed to —SH disappeared and instead, an absorption peak attributed to the C-H stretching vibration of —CH$_2$— was observed between 3000 and 2800 cm$^{-1}$.

From the results of the above measurements and elemental analysis, A-A Copolymer (4) thus obtained is judged to be a copolymer having an average composition composed of 31 mol % of units represented by the chemical formula:

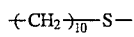

and 69 mol % of units represented by the chemical formula:

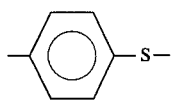

EXAMPLE 5

A titanium-lined autoclave was charged with 150 g (1.39 basal moles) of the granular PATE (1), 1,500 g of NMP, 25.g (0.32 mole) of Na$_2$S and 55 g (3.05 moles) of water. After the autoclave being purged with nitrogen gas, the contents were heated for 2.5 hours at 245° C. while stirring them to conduct a thiolate-forming reaction to cut the molecular chain of PATE (1), thereby converting PATE (1) into an alkali thiolate-containing product. The amount of Na$_2$S remaining in this reaction mixture was 5 mol % of the charged amount.

After the reaction mixture (containing 0.304 mole of the alkali thiolate-containing product and 0.016 mole of Na$_2$S) subjected to the alkali thiolate-forming reaction was added with 52 g (0.34 mole) of 1,6-dichlorohexane to react them for 1 hour at a temperature of 150° C., 200 g (11.1 moles) of water was introduced under pressure to react the contents for 1 hour at 240° C.

The resulting reaction mixture was treated in the same manner as in Example i to obtain a polymer [A-A Copolymer (5)] as granules.

A-A Copolymer (5) thus obtained had Tm of 191° C., Tg of 17° C. and a melt viscosity of 150 poises (at 241° C.).

The infrared absorption spectrum of white powder obtained by treating the reaction mixture obtained by causing Na$_2$S to act on PATE (1) and containing the alkali thiolate-containing product in the same manner as in Example 1 was measured. As a result, an absorption peak attributed to the stretching vibration of —SH was observed at 2560 cm$^{-1}$. Further, the number-average molecular weight of a product with the alkali thiolate groups in the alkali thiolate-containing product converted into methyl thioether groups was found to be about 550. This means that the alkali-thiolate containing product corresponds to an alkalithiolate containing compound represented by the general formula (III) in which n is about 4.5.

In an infrared absorption spectrum on A-A Copolymer (5) on the other hand, the absorption peak attributed to —SH disappeared and instead, an absorption peak attributed to the C-H stretching vibration of —CH$_2$—was observed between 3000 and 2800 cm$^{-1}$.

EXAMPLE 6

In a titanium-lined autoclave, a mixture consisting of 1,000 g of NMP, 118.8 g (0.81 mole) of p-dichlorobenzene, 62.4 g (0.80 mole) of Na$_2$S, 0.2 g (0.003 mole) of Ca(OH)$_2$ and 54 g (3 moles) of water was heated for 3 hours at 250° C. while stirring it to form poly(p-phenylene thioether). A small amount of the resulting reaction mixture sample was analyzed by gas chromatography. As a result, it was found that the conversion of p-dichlorobenzene was 98%.

To this reaction mixture, were added 15.6 g (0.20 mole) of Na$_2$S, 10.8 g (0.60 mole) of water, 12 g (0.3 mole) of NaOH and 500 g of NMP. Thereafter, the contents were stirred to obtain an intimate liquid mixture. The pH of an aqueous mixture obtained by diluting a small amount of the liquid mixture sample with water in an amount 100 times the weight of the mixture was 11.3.

The liquid mixture was heated for 2 hours at 250° C. to conduct depolymerization to cut the molecular chain of the poly(p-phenylene thioether) by Na$_2$S, thereby converting the poly(p-phenylene thioether) into an alkali thiolate-containing product. The amount of Na$_2$S remaining in this reaction mixture was 6 mol % of the charged amount.

After the reaction mixture (containing 0.188 mole of the alkali thiolate-containing product and 0.012 mole of Na₂S) subjected to the alkali thiolate-forming reaction was then added with 66.3 g (0.202 mole) of 1,12-dibromododecane to react them for 4 hours at 180° C., 105 g (5.8 moles) of water was poured to heat the contents further for 2 hours at 250° C. Thereafter, the thus-heated reaction mixture was treated in the same manner as in Example 1 to obtain a polymer [A-A Copolymer (6)] as a white flake.

A-A Copolymer (6) thus obtained had Tm of 195° C., Tg of −7° C. and a melt viscosity of 150 poises (at 245° C.).

The infrared absorption spectrum of white powder obtained by treating the reaction mixture obtained by causing Na₂S to act on the poly(p-phenylene thioether) and containing the alkali thiolate-containing product in the same manner as in Example I was measured. As a result, an absorption peak attributed to the stretching vibration of —SH was observed at 2560 cm⁻¹. Further, the number-average molecular weight of a product with the alkali thiolate groups in the alkali thiolate-containing product converted into methyl thioether groups was found to be about 500. This means that the alkali-thiolate containing product corresponds to an alkali-thiolate containing compound represented by the general formula (III) in which n is about 4.

In an infrared absorption spectrum on A-A Copolymer (6) on the other hand, the absorption peak attributed to —SH disappeared and instead, an absorption peak attributed to the C-H stretching vibration of —CH₂— was observed between 3000 and 2800 cm⁻¹.

From the results of the above measurements and elemental analysis, A-A Copolymer (6) thus obtained is judged to be a copolymer having an average composition composed of 23 mol % of units represented by the chemical formula:

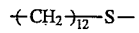

and 77 mol % of units represented by the chemical formula:

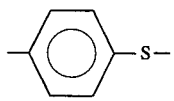

COMPARATIVE EXAMPLE 1

As a comparative example, the following polymerization experiment was performed in place of Example 1. In a titanium-lined autoclave, 86.4 g (0.8 basal mole) of PATE (1) 1,200 g of NMP, 15.6 g (0.20 mole) of Na₂S, 16 g (0.4 mole) of NaOH, 65.6 g (0.2 mole) of 1,12-dibromododecane and 36.0 g (2 moles) of water were mixed with stirring to heat them for 2 hours at 250° C., thereby reacting them. Thereafter, 108 g (6 moles) of water was introduced under pressure to heat the resulting mixture further for 2 hours at 250° C.

The resulting liquid reaction mixture was treated in the same manner as in Example 1 to obtain a polymer [Polymer (R1)] as ivory granules. Polymer (R1) thus obtained had Tm of 277° C. and Tg of 66° C.

Judging from the elemental analysis, it is assumed that Polymer (R1) has an average composition composed of 6 mol % of units represented by the chemical formula:

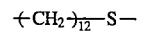

and 94 mol % of units represented by the chemical formula:

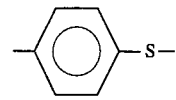

According to the process of this comparative example, the composition of the charged components is greatly different from that of the resulting copolymer. It is therefore understood that good copolymerizability can not be attained unlike the process of Example 1.

COMPARATIVE EXAMPLE 2

As a comparative example, the following polymerization experiment was performed in place of Example 6. In a titanium-lined autoclave, 1,500 g of NMP, 78 g (1.0 mole) of Na₂S, 118.8 g (0.81 mole) of p-dichlorobenzene, 66.3 g (0.202 mole) of 1,12-dibromododecane, 0.2 g (0.003 mole) of Ca(OH)₂, 12 g (0.3 mole) of NaOH and 64.8 g (3.6 moles) of water were mixed with stirring to heat them for 2 hours at 250° C., thereby reacting them. Thereafter, 105 g (5.8 moles) of water was introduced under pressure to heat the resulting mixture further for 2 hours at 250° C.

The resulting liquid reaction mixture was filtered by a filter paper and then treated in the same manner as in Example 1 to obtain a polymer [Polymer (R2)] as pale yellow powder.

Polymer (R2) thus obtained had an average composition composed of 21 mol % of units represented by the chemical formula:

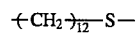

and 79 mol % of units represented by the chemical formula:

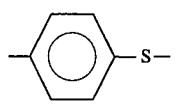

as determined by the elemental analysis. However, the polymer had two melting points, Tm of 254° C. and 80° C. unlike A-A Copolymer (6) of Example 6. It is therefore understood that Polymer (R2) is lacking in uniformity in composition. In addition, its polymerization degree was also low as demonstrated by its melt viscosity of 5 poises or lower (at 304° C.).

COMPARATIVE EXAMPLE 3

As a comparative example of Example 3, the same procedure as in Example 3 was repeated except that the contents were heated at 180° C. in place of heating at 240° C. to conduct the alkali thiolate-forming reaction of PATE (2) in which PATE (2) was depolymerized to cut its molecular chain.

It was observed that particulate solids originated from unreacted PATE (2) remained in the reaction mixture after the alkali thiolate-forming reaction. The amount of Na₂S remaining in this reaction mixture was 96 mol % of the charged amount.

However, the subsequent copolymerization and post-treatment processes were advanced in the same manner as in Example 3 to obtain a polymer [Polymer (R3)].

Polymer (R3) thus obtained had Tm of 280° C. and Tg of 85° C. Its composition was also substantially equal to that of PATE (2).

COMPARATIVE EXAMPLE 4

As another comparative example of Example 1, a liquid mixture was prepared in the same manner as in Example 1 except that 5.4 g (0.1 mole) of ammonium chloride was used in place of 16 g (0.4 mole) of NaOH. The pH of an aqueous mixture obtained by diluting an extremely small amount of the liquid mixture sample with water in an amount 100 times the weight of the mixture was 8.5.

Using this liquid mixture, the alkali thiolate-forming reaction was then conducted in the same manner as in Example 1. It was however observed that the reaction mixture after completion of the reaction turned dark brown and gave off an offensive odor and hence, decomposition reaction took place, so that the subsequent processes were discontinued.

We claim:

1. A process for the production of an alkylene thioether-arylene thioether copolymer, which comprises copolymerizably reacting a compound having at least one alkali thiolate group and obtained by causing an alkali metal sulfide to act on a poly(arylene thioether) having recurring units represented by the general formula (I):

$$\text{\textendash}(Ar\text{\textendash}S)\text{\textendash} \qquad (I)$$

wherein Ar means an arylene group, in a water-containing polar organic solvent so as to depolymerize the poly(arylene thioether) with a dihalogen-substituted aliphatic compound represented by the general formula (II):

wherein $X_1$ and $X_2$ mean individually a halogen atom, $R_1$ through $R_4$ denote individually a hydrogen atom or an alkyl group having 1–6 carbon atoms and may be identical to or different from one another, and $R_5$ stands for an aliphatic compound residue having 1–200 carbon atoms, and optionally, an alkali metal sulfide in a water-containing polar organic solvent.

2. The process as claimed in claim 1, wherein the poly(arylene thioether) represented by the general formula (I) and subjected to the depolymerization is a poly (phenylene sulfide).

3. The process as claimed in claim 1, wherein the compound having at least one alkali thiolate group is a compound obtained by subjecting a mixture comprising:

(A) a polar organic solvent containing water in a proportion of 0.1–10 moles per kg of the polar organic solvent;

(B) a poly(arylene thioether) in a proportion of 0.1–5 basal moles per kg of the polar organic solvent, wherein the term "basal mole" means the number of moles, which has been calculated supposing the sum of atomic weights of atoms constituting the recurring unit represented by the general formula (I) is 1 gram molecule; and (C) an alkali metal sulfide in a proportion of 0.02–1 mole per basal mole of the poly(arylene thioether), to a depolymerization reaction.

4. The process as claimed in claim 1, wherein the compound having at least one alkali thiolate group is a compound represented by the general formula (III):

$$MS\text{\textendash}(Ar\text{\textendash}S)_{\overline{n}}M \qquad (III)$$

wherein M means an alkali metal atom, Ar denotes an arylene group, and n stands for a number of recurring units.

5. The process as claimed in claim 1, wherein the dihalogen-substituted aliphatic compound is a dihaloalkane, a dihalogenated olefin oligomer or a hydrogenated product of a dihalogenated olefin oligomer.

6. The process as claimed in claim 1, wherein the copolymerization reaction of the compound having at least one alkali thiolate group with the dihalogen-substituted aliphatic compound represented by the general formula [II] is conducted by subjecting a mixture comprising:

(a) the polar organic solvent containing water in a proportion of 0.1–30 moles per kg of the polar organic solvent;

(b) the alkali thiolate-containing compound in a proportion of 0.1–10 basal moles per kg of the polar organic solvent, wherein the term "basal mole" means the number of moles, which has been calculated supposing the sum of atomic weights of atoms constituting the recurring unit represented by the general formula (I) is 1 gram molecule; and (c) the dihalogen-substituted aliphatic compound represented by the general formula (II) in a proportion of 0.8–2 moles per mole of the alkali thiolate-containing compound to a reaction under heat.

7. The process as claimed in claim 6, wherein the copolymerization reaction is conducted for 0.2–30 hours at a temperature of 30°–220° C.

8. The process as claimed in claim 6, wherein the copolymerization reaction is conducted, as a reaction of the first stage, for 0.2–30 hours at 30°–220° C. and then, as a reaction of the second stage, for 0.2–30 hours at a temperature higher than 220° C. but not higher than 300° C.

9. The process as claimed in claim 8, wherein water is added before or after the reaction temperature is raised upon the reaction of the second stage so as to control the water content in the reaction system within a range of 5–30 moles per mole of the polar organic solvent in the system.

* * * * *